United States Patent
Rangari et al.

(10) Patent No.: US 9,575,789 B1
(45) Date of Patent: Feb. 21, 2017

(54) SYSTEMS AND METHODS FOR ENABLING MIGRATORY VIRTUAL MACHINES TO EXPEDITE ACCESS TO RESOURCES

(71) Applicant: Symantec Corporation, Mountain View, CA (US)

(72) Inventors: Amit Haridas Rangari, Maharashtra (IN); Udipta Das, Maharashtra (IN)

(73) Assignee: Veritas Technologies, Mountain View, CA (US)

( * ) Notice: Subject to any disclaimer, the term of this patent is extended or adjusted under 35 U.S.C. 154(b) by 269 days.

(21) Appl. No.: 13/928,340

(22) Filed: Jun. 26, 2013

(51) Int. Cl.
G06F 9/455 (2006.01)

(52) U.S. Cl.
CPC ....... G06F 9/45558 (2013.01); G06F 9/45533 (2013.01); *G06F 2009/4557* (2013.01)

(58) Field of Classification Search
CPC .............. G06F 9/45533; G06F 9/45558; G06F 2009/4557
See application file for complete search history.

(56) References Cited

U.S. PATENT DOCUMENTS

| | | | | |
|---|---|---|---|---|
| 7,757,231 | B2 * | 7/2010 | Anderson et al. ................. | 718/1 |
| 8,726,404 | B2 * | 5/2014 | Vipat .................. | G06F 9/45533 726/27 |
| 8,819,369 | B1 * | 8/2014 | Alappat et al. ............... | 711/162 |
| 8,910,152 | B1 * | 12/2014 | Hyser ................. | G06F 9/45558 718/1 |
| 2005/0108440 | A1 * | 5/2005 | Baumberger et al. ............ | 710/1 |
| 2009/0025007 | A1 * | 1/2009 | Hara et al. ..................... | 718/105 |
| 2010/0115513 | A1 * | 5/2010 | Moriki .................... | G06F 9/463 718/1 |
| 2010/0268812 | A1 * | 10/2010 | Mohrmann et al. .......... | 709/224 |
| 2011/0197052 | A1 * | 8/2011 | Green et al. ...................... | 713/2 |
| 2012/0265976 | A1 * | 10/2012 | Spiers et al. ...................... | 713/2 |
| 2012/0278571 | A1 * | 11/2012 | Fleming et al. .............. | 711/162 |
| 2013/0305242 | A1 * | 11/2013 | Wang et al. ..................... | 718/1 |

(Continued)

OTHER PUBLICATIONS

Amit Haridas Rangari, et al.; Detecting Site Change for Migrated Virtual Machines; U.S. Appl. No. 13/930,752, filed Jun. 28, 2013.

(Continued)

Primary Examiner — Lewis A Bullock, Jr.
Assistant Examiner — Jacob Dascomb
(74) Attorney, Agent, or Firm — FisherBroyles LLP

(57) ABSTRACT

A computer-implemented method for enabling migratory virtual machines to expedite access to resources may include (1) detecting a migration of a virtual machine from a physical computing system to a different physical computing system, (2) locating resource information within the virtual machine that identifies an access path to a resource of the physical computing system despite the migration of the virtual machine, (3) identifying a different access path to a corresponding resource of the different physical computing system, and then (4) modifying the resource information within the virtual machine to identify the different access path to the corresponding resource in order to expedite resource access by enabling the virtual machine to access the corresponding resource via the different access path instead of accessing the resource via the access path. Various other methods, systems, and computer-readable media are also disclosed.

20 Claims, 7 Drawing Sheets

(56) References Cited

U.S. PATENT DOCUMENTS

2014/0250220 A1* 9/2014 Kapadia et al. .............. 709/224

OTHER PUBLICATIONS

Amit Haridas Rangari, et al.; Methods to detect site change, due to live/suspend-resume/stopped-started/any other type of migration of virtualized objects like virtual machines; U.S. Appl. No. 13/928,340, filed May 8, 2013.
Hinker, Stefan, "LDoms and LDCs", https://blogs.oracle.com/cmt/entry/Idoms_and_Idcs, as accessed Apr. 2, 2013, (Aug. 12, 2010).
"VMware vSphere Hypervisor", https://www.vmware.com/products/vsphere-hypervisor, as accessed Apr. 22, 2013, (Jun. 15, 2010).
Kadav, Asim et al., "Live Migration of Direct-Access Devices", http://pages.cs.wisc.edu/~swift/papers/shadow-migrate.pdf, as accessed Apr. 22, 2013, (On or before Apr. 22, 2013).

* cited by examiner

SYSTEMS AND METHODS FOR ENABLING MIGRATORY VIRTUAL MACHINES TO EXPEDITE ACCESS TO RESOURCES

BACKGROUND

Virtual machines may have the ability to migrate from one physical computing system to another in a variety of computer-networking scenarios. For example, a stretched computer cluster may include a physical computing system located at a local site and another physical computing system located at a remote site. In this example, a virtual machine may be configured to run on the physical computing system located at the local site. However, in the event that the physical computing system experiences a failure that potentially prevents the virtual machine from running properly, the virtual machine may migrate from the physical computing system to the other physical computing system located at the remote site.

While conventional virtualization technologies may enable the virtual machine to migrate from the physical computing system located at the local site to the other physical computing system located at the remote site, such virtualization technologies may have certain shortcomings and/or inefficiencies that negatively impact performance. For example, the stretched computer cluster may also include one or more redundant resources (such as mirrored storage devices and/or network routers) located at the local site and the remote site. Unfortunately, the virtual machine may still be configured to access those resources located at the local site even after migrating to the other physical computing system located at the remote site.

What is needed, therefore, are systems and methods for enabling migratory virtual machines to expedite access to computing resources.

SUMMARY

As will be described in greater detail below, the instant disclosure generally relates to systems and methods for enabling migratory virtual machines to expedite access to resources by configuring the virtual machines to access those resources located proximate to the physical computing systems to which the virtual machines have migrated.

In one example, a computer-implemented method for enabling migratory virtual machines to expedite access to resources may include (1) detecting a migration of a virtual machine from a physical computing system to a different physical computing system, (2) locating resource information within the virtual machine that identifies an access path to a resource of the physical computing system despite the migration of the virtual machine from the physical computing system to the different physical computing system, (3) identifying a different access path to a corresponding resource of the different physical computing system, and then (4) modifying the resource information within the virtual machine to identify the different access path to the corresponding resource in order to expedite resource access by enabling the virtual machine to access the corresponding resource via the different access path instead of accessing the resource via the access path.

In some examples, the method may also include monitoring the virtual machine for evidence of migration. In such examples, the method may further include detecting evidence indicating that the virtual machine has at least started the migration from the physical computing system to the different physical computing system while monitoring the virtual machine. Additionally or alternatively, the method may include providing the virtual machine with an event that notifies the virtual machine of the migration from the physical computing system to the different physical computing system in response to detecting the evidence.

In some examples, the method may also include identifying at least one communication channel that facilitates communication between the virtual machine and at least one hypervisor. In such examples, the method may further include directing the hypervisor to provide the virtual machine with the event that notifies the virtual machine of the migration via the communication channel.

In some examples, the method may also include identifying an operating system kernel of the virtual machine. In such examples, the method may further include directing the hypervisor to provide the event as a callback to the operating system kernel of the virtual machine via the communication channel. Additionally or alternatively, the method may include ensuring that the virtual machine captures the event at a root privilege level.

In some examples, the method may also include detecting an event provided by a hypervisor that facilitates execution of the virtual machine. In such examples, the method may further include determining that the event indicates that the virtual machine has at least started the migration from the physical computing system to the different physical computing system.

In some examples, the method may also include obtaining information that identifies the different access path to the corresponding resource of the different physical computing system via the event. Additionally or alternatively, the method may include obtaining a resource update that identifies the different access path to the corresponding resource of the different physical computing system in connection with the event. The method may further include determining that the different access path does not match the access path identified in the resource information by comparing the different access path with the access path.

In some examples, the method may also include modifying the resource information within the virtual machine to point to the different access path in order to enable the virtual machine to access the corresponding resource via the different access path in a shorter amount of time than the virtual machine is able to access the resource via the access path.

In some examples, the physical computing system may be located at a specific physical location. In such examples, the different physical computing system may be located at a different physical location that is remote from the specific physical location.

In some examples, the access path to the resource may include an access path to a storage device located at the specific physical location. In such examples, the different access path to the corresponding resource may include an access path to a different storage device located at the different physical location.

In some examples, the access path to the resource may include an access path to a router located at the specific physical location. In such examples, the different access path to the corresponding resource may include an access path to a different router located at the different physical location.

In one embodiment, a system for implementing the above-described method may include (1) a detection module that detects a migration of a virtual machine from a physical computing system to a different physical computing system, (2) an identification module that (i) locates resource information within the virtual machine that identifies an access path to a resource of the physical computing system despite the migration of the virtual machine from the physical computing system to the different physical computing system and (ii) identifies a different access path to a corresponding resource of the different physical computing system, and (3) a modification module that modifies the resource information within the virtual machine to identify the different access path to the corresponding resource in order to expedite resource access by enabling the virtual machine to access the corresponding resource via the different access path instead of accessing the resource via the access path.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) detect a migration of a virtual machine from a physical computing system to a different physical computing system, (2) locate resource information within the virtual machine that identifies an access path to a resource of the physical computing system despite the migration of the virtual machine from the physical computing system to the different physical computing system, (3) identify a different access path to a corresponding resource of the different physical computing system, and then (4) modify the resource information within the virtual machine to identify the different access path to the corresponding resource in order to expedite resource access by enabling the virtual machine to access the corresponding resource via the different access path instead of accessing the resource via the access path.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
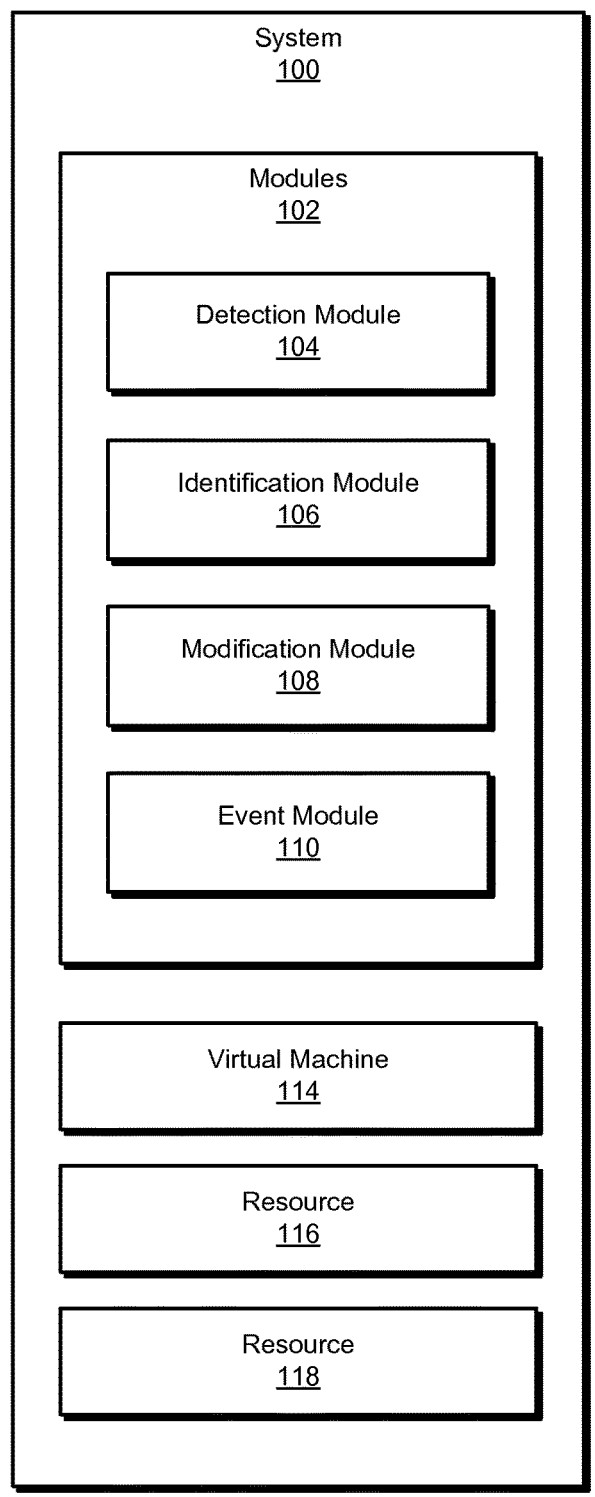
FIG. 1 is a block diagram of an exemplary system for enabling migratory virtual machines to expedite access to resources.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for enabling migratory virtual machines to expedite access to resources. As will be explained in greater detail below, by identifying an access path to a resource of a physical computing system to which a virtual machine has migrated, the various systems and methods described herein may modify certain resource information within the virtual machine to point to the resource via the access path. By modifying this resource information within the virtual machine, the various systems and methods described herein may enable and/or direct the virtual machine to access the resource in a shorter amount of time than the virtual machine would have been able to access a similar or identical resource via a less efficient access path (e.g., a longer access path) previously identified in the resource information.

Figure 2:
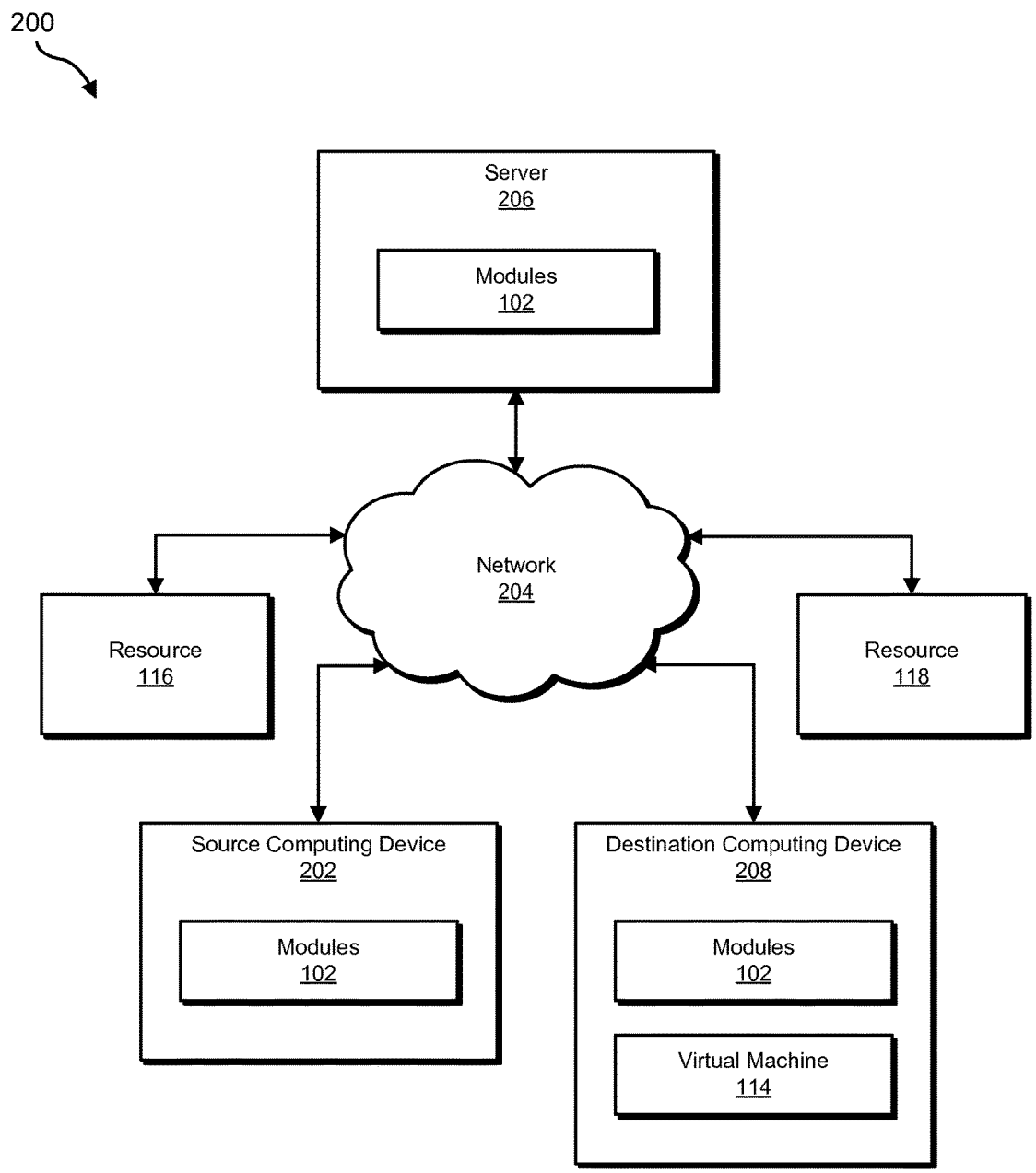
FIG. 2 is a block diagram of an exemplary system for enabling migratory virtual machines to expedite access to resources.

The following will provide, with reference to FIGS. 1-2, detailed descriptions of exemplary systems for enabling migratory virtual machines to expedite access to resources. Detailed descriptions of corresponding computer-implemented methods will be provided in connection with FIG. 3. Detailed descriptions of exemplary stretched clusters will be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for enabling migratory virtual machines to expedite access to resources. As illustrated in this figure, exemplary system 100 may include one or more modules 102 for performing one or more tasks. For example, and as will be explained in greater detail below, exemplary system 100 may include a detection module 104 that detects a migration of a virtual machine from a physical computing system to a different physical computing system. Exemplary system 100 may also include an identification module 106 that (1) locates resource information within the virtual machine that identifies an access path to a resource of the physical computing system despite the migration of the virtual machine from the physical computing system to the different physical computing system and then (2) identifies a different access path to a corresponding resource of the different physical computing system.

In addition, and as will be described in greater detail below, exemplary system 100 may include a modification module 108 that modifies the resource information within the virtual machine to identify the different access path to the corresponding resource in order to expedite resource access by enabling the virtual machine to access the corresponding resource via the different access path instead of accessing the resource via the access path. Exemplary system 100 may further include an event module 110 that provides the virtual machine with an event that notifies the virtual machine of the migration in response to the detection of the evidence.

Although illustrated as separate elements, one or more of modules 102 in FIG. 1 may represent portions of a single module or application (such as SYMANTEC V-RAY, VMWARE VSPHERE, VMWARE VCLOUD, VMWARE FUSION, VMWARE WORKSTATION, VMWARE HORIZON VIEW, VMWARE VCENTER OPERATIONS MANAGEMENT SUITE, XENSERVER, CLOUDPLATFORM, CLOUDPORTAL, XENDESKTOP, XENAPP, XENCLIENT, VDI-IN-A-BOX, ORACLE VM SERVER, ORACLE VM VIRTUAL BOX, ORACLE DESKTOP VIRTUALIZATION, MIRCROSOFT HYPER-V SERVER, and/or a single virtual machine).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., source computing device 202, destination computing device 208, and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more virtual machines, such as virtual machine 114. In one example, virtual machine 114 may be able to migrate from one physical computing system to another. For example, virtual machine 114 may migrate from source computing device 202 in FIG. 2 to at least one of server 206 in FIG. 2, destination computing device 208 in FIG. 2, computing system 610 in FIG. 6, and/or portions of exemplary network architecture 700 in FIG. 7. The phrase "virtual machine," as used herein, generally refers to any operating system environment that is abstracted from computing hardware by a virtual machine manager (e.g., a hypervisor).

As illustrated in FIG. 1, exemplary system 100 may also include one or more resources, such as resources 116 and 118. In one example, one or more of resources 116 and 118 may be accessible to one or more physical computing systems and/or virtual machines. For example, resources 116 and 118 may be accessible to virtual machine 114 via one or more access paths (e.g., access paths 500 and 502 in FIG. 5). The term "resource," as used herein, generally refers to any type or form of physical or virtual asset and/or benefit capable of being accessed and/or obtained by at least one physical computing system or virtual machine. Examples of resources 116 and 118 include, without limitation, storage devices (e.g., mirrored storage devices), storage enclosures, stored data and/or information, one or more portions of one or more physical computing systems (e.g., source computing device 202 and destination computing device 208 in FIG. 2), one or more portions of one or more servers (e.g., server 206 in FIG. 2), network devices, routers, switches, gateways, combinations of one or more of the same, or any other suitable resources.

In some examples, resources 116 and 118 may be at least partially redundant to one another. In one example, resources 116 and 118 may each include and/or provide access to at least a portion of the same data. In another example, resources 116 and 118 may each fulfill the same purpose and/or provide the same functionality within a network or physical computing system.

Exemplary system 100 in FIG. 1 may be implemented in a variety of ways. For example, all or a portion of exemplary system 100 may represent portions of exemplary system 200 in FIG. 2. As shown in FIG. 2, system 200 may include a source computing device 202 and a destination computing device 208 in communication with a server 206 via a network 204. System 200 may also include resources 116 and 118 accessible to source computing device 202 and/or destination computing device 208 via network 204.

In one example, source computing device 202 may be programmed with one or more of modules 102 and/or include virtual machine 114 (before virtual machine 114 migrates to destination computing device 208). Additionally or alternatively, destination computing device 208 may be programmed with one or more of modules 102 and/or include virtual machine 114 (after virtual machine 114 has migrated from source computing device 202). Additionally or alternatively, server 206 may be programmed with one or more of modules 102.

In one example, exemplary system 100 may represent portions of exemplary system 200 without involving or including server 206. For example, all or a portion of exemplary system 100 may represent portions of source computing device 202 in communication with destination computing device 208 via network 204. In this example, server 206 may not necessarily contribute to or otherwise be involved in enabling virtual machine 114 to expedite access to certain resources.

In one embodiment, one or more of modules 102 from FIG. 1 may, when executed by at least one processor of source computing device 202, destination computing device 208, and/or server 206, facilitate source computing device 202, destination computing device 208, and/or server 206 in enabling migratory virtual machines to expedite access to resources. For example, and as will be described in greater detail below, one or more of modules 102 may cause source computing device 202, destination computing device 208, and/or server 206 to (1) detect a migration of virtual machine 114 from source computing device 202 to destination computing device 208, (2) locate resource information within virtual machine 114 that identifies an access path to resource 116 of source computing device 202 despite the migration of the virtual machine from source computing device 202 to destination computing device 208, (3) identify an access path to resource 118 of destination computing device 208, and then (4) modify the resource information within virtual machine 114 to identify the access path to resource 118 in order to expedite resource access by enabling virtual machine 114 to access resource 118 instead of resource 116.

Source computing device 202 generally represents any type or form of computing device capable of reading computer-executable instructions. Examples of source computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Destination computing device 208 generally represents any type or form of computing device capable of reading computer-executable instructions. Examples of destination computing device 208 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device capable of helping to enable a virtual machine to expedite access to one or more resources. Examples of servers 206 include, without limitation, application servers, web servers, storage servers, and/or database servers configured to run certain software applications and/or provide various web, storage, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication among source computing device 202, destination computing device 208, and/or server 206.

Figure 3:
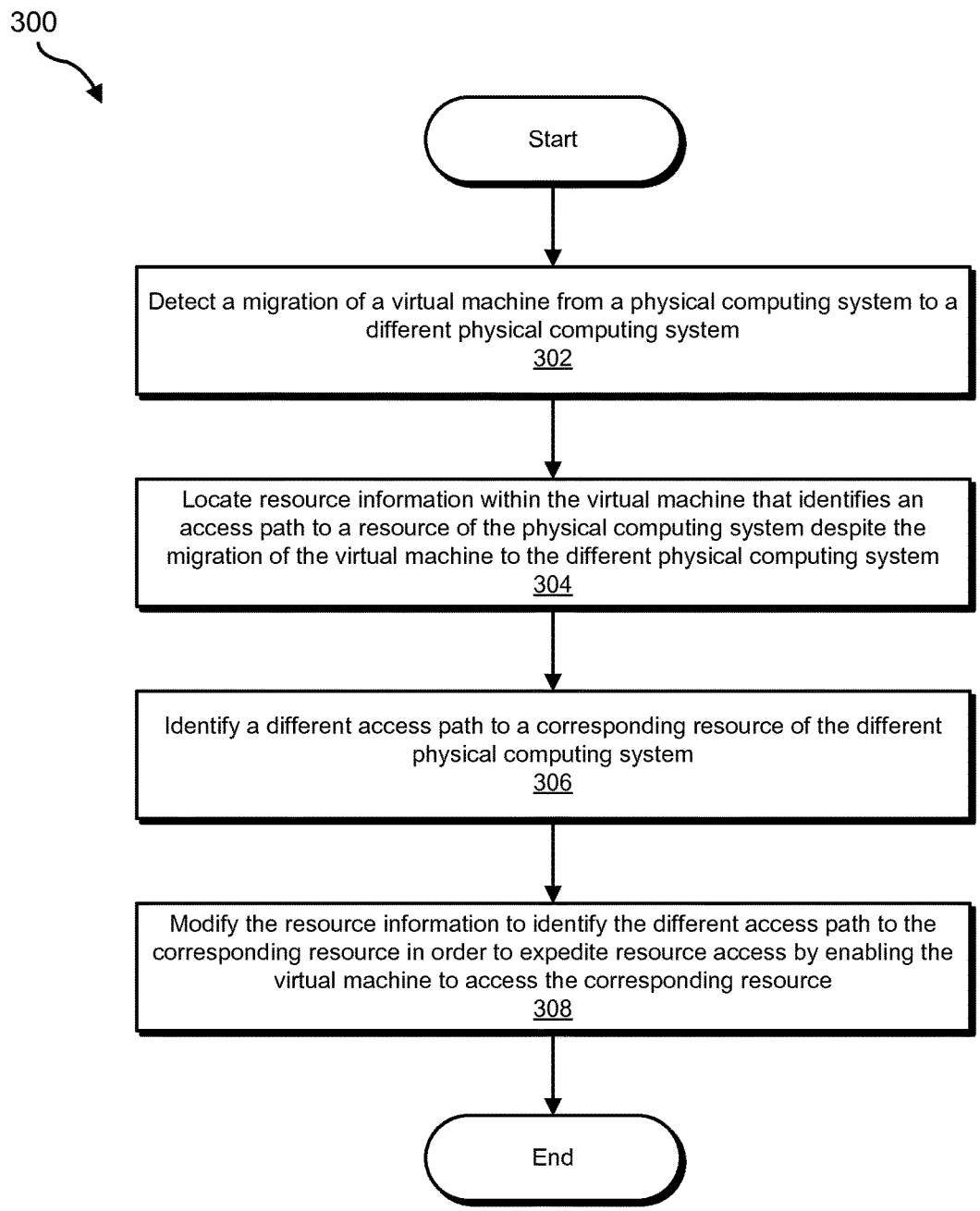
FIG. 3 is a flow diagram of an exemplary method for enabling migratory virtual machines to expedite access to resources.

FIG. 3 is a flow diagram of an exemplary computer-implemented method 300 for enabling migratory virtual machines to expedite access to resources. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may detect a migration of a virtual machine from a physical computing system to a different physical computing system. For example, at step 302 detection module 104 may, as part of source computing device 202, destination computing device 208, and/or server 206 in FIG. 2, detect a migration of virtual machine 114 from source computing device 202 to destination computing device 208 via network 204. In this example, the migration of virtual machine 114 from source computing device 202 to destination computing device 208 may represent any type or form of live migration (such as pre-copy memory migration or post-copy memory migration). The phrase "live migration," as used herein generally refers to the act of moving a running virtual machine from one physical computing system to another physical computing system without disrupting the processes performed by and/or within the virtual machine.

The systems described herein may perform step 302 in a variety of ways. In some examples, detection module 104 may detect the migration before virtual machine 114 starts to actually migrate from source computing device 202 to destination computing device 208. For example, source computing device 202 may receive a request from destination computing device 208 and/or server 206 to initiate the migration of virtual machine 114 via network 204. In this example, detection module 104 may, as part of source computing device 202, detect the request to initiate the migration as source computing device 202 receives the request. Detection module 104 may then determine that virtual machine 114 is to start migrating from source computing device 202 to destination computing device 208 based at least in part on this request.

In some examples, detection module 104 may detect the migration after virtual machine 114 has actually migrated from source computing device 202 to destination computing device 208. For example, destination computing device 208 may receive virtual machine 114 from source computing device 202 via network 204. In this example, detection module 104 may, as part of destination computing device 208, detect virtual machine 114 as destination computing device 208 receives and/or executes virtual machine 114. Detection module 104 may then determine that virtual machine 114 has migrated from source computing device 202 to destination computing device 208 based at least in part on this detection.

In some examples, detection module 104 may detect the migration while virtual machine 114 is in the process of migrating from source computing device 202 to destination computing device 208. For example, server 206 may manage one or more services and/or applications running on source computing device 202 and/or destination computing device 208 via network 204. In this example, detection module 104 may, as part of server 206, detect the migration of virtual machine 114 from source computing device 202 to destination computing device 208 while the migration is in progress. Detection module 104 may then determine that virtual machine 114 is in the process of migrating from source computing device 202 to destination computing device 208 based at least in part on this detection.

In some examples, detection module 104 may monitor virtual machine 114 and/or source computing device 202 for evidence of migration. In such examples, while monitoring virtual machine 114 and/or source computing device 202, detection module 104 may detect evidence indicating that virtual machine 114 has at least started the migration from source computing device 202 to destination computing device 208.

In one example, detection module 104 may monitor at least one hypervisor that facilitates execution of virtual machine 114 on source computing device 202. In this example, while monitoring the hypervisor, detection module 104 may detect evidence indicating that the hypervisor has started to copy memory pages of virtual machine 114 from source computing device 202 to destination computing device 208 via network 204. Detection module 104 may then determine that virtual machine 114 has at least started the migration from source computing device 202 to destination computing device 208 based at least in part on this copying of memory pages of virtual machine 114 from source computing device 202 to destination computing device 208.

In some examples, the detection of evidence indicating that virtual machine 114 has at least started the migration may trigger one or more events. For example, event module 110 may, as part of source computing device 202, destination computing device 208, and/or server 206 in FIG. 2, provide virtual machine 114 with an event that notifies virtual machine 114 of the migration from source computing device 202 to destination computing device 208.

In one example, event module 110 may provide virtual machine 114 with the event before virtual machine 114 migrates from source computing device 202 to destination computing device 208. Additionally or alternatively, event module 110 may provide virtual machine 114 with the event after virtual machine 114 has migrated from source computing device 202 to destination computing device 208. Additionally or alternatively, event module 110 may provide virtual machine 114 with the event while virtual machine 114 is in the process of migrating from source computing device 202 to destination computing device 208.

In one example, identification module 106 may identify at least one communication channel that facilitates communication between virtual machine 114 and at least one hypervisor on source computing device 202 and/or destination computing device 208. The communication channel may be provided by virtualization software that facilitates execution of virtual machine 114 on source computing device 202. Examples of such virtualization software include, without limitation, SYMANTEC V-RAY, VMWARE VSPHERE, VMWARE VCLOUD, VMWARE FUSION, VMWARE WORKSTATION, VMWARE HORIZON VIEW, VMWARE VCENTER OPERATIONS MANAGEMENT SUITE, XENSERVER, CLOUDPLATFORM, CLOUDPORTAL, XENDESKTOP, XENAPP, XENCLIENT, VDI-IN-A-BOX, ORACLE VM SERVER, ORACLE VM VIRTUAL BOX, ORACLE DESKTOP VIRTUALIZATION, and/or MIRCROSOFT HYPER-V SERVER.

After identification module 106 has identified the communication channel, event module 110 may direct the hypervisor to provide virtual machine 114 with the event that notifies virtual machine 114 of the migration via the communication channel. For example, identification module 106 may identify an operating system kernel of virtual machine 114. Event module 110 may then direct the hypervisor to provide the event as a callback to the identified operating system kernel of virtual machine 114 via the communication channel. By directing the hypervisor to provide the event as a callback to the identified operating system kernel of virtual machine 114 via the communication channel, event module 110 may ensure that virtual machine 114 captures the event at a root privilege level and/or an administrator privilege level and uses the event as intended.

In some examples, event module 110 may also insert certain information about changes to the host computing device into the event to notify virtual machine 114 of any differences between source computing device 202 and/or destination computing device 208. For example, identification module 106 may identify at least one property that is different between source computing device 202 and/or destination computing device 208. After identification module 106 has identified this different property, event module 110 may insert information that identifies the different property into the event to notify virtual machine 114 of the different property. Examples of such a property include, without limitation, the computer architecture of the processor used by the host computing device, the family of processor used by the host computing device, the manufacturer of the host computing device and/or the processor used by the host computing device, the virtualization software installed on the host computing device, an access path to a specific resource of the host computing device, and/or any other suitable property.

In one example, detection module 104 may detect the event provided by the hypervisor to virtual machine 114. For example, detection module 104 may, as part of virtual machine 114 running on destination computing device 208 in FIG. 2, detect the event provided by the hypervisor to virtual machine 114. In this example, detection module 104 may determine that the event indicates that virtual machine 114 has at least started migrating from source computing device 202 to destination computing device 208.

The migration of virtual machine 114 may be initiated for any number of reasons. For example, source computing device 202 may experience a failure that potentially prevents virtual machine 114 from running properly. In this example, virtual machine 114 may automatically fail over from source computing device 202 to destination computing device 208 to ensure high availability of virtual machine 114.

In another example, an administrator of source computing device 202 may want to move virtual machine 114 to destination computing device 208 in order to perform some maintenance on source computing device 202 and/or replace source computing device 202. In this example, virtual machine 114 may migrate from source computing device 202 to destination computing device 208 in response to a request from the administrator.

In some examples, source computing device 202 and destination computing device 208 may form at least part of a computer cluster. The phrase "computer cluster," as used herein, generally refers to a group of two or more computing devices capable of communicating with one another to collectively perform one or more tasks (such as collectively providing high availability of a virtual machine). Examples of this computer cluster include, without limitation, high-availability clusters, stretched clusters, load-balancing clusters, Beowolf clusters, high-performance computing clusters, disaster-recovery clusters, combinations of one or more of the same, or any other suitable computer cluster.

Figure 4:
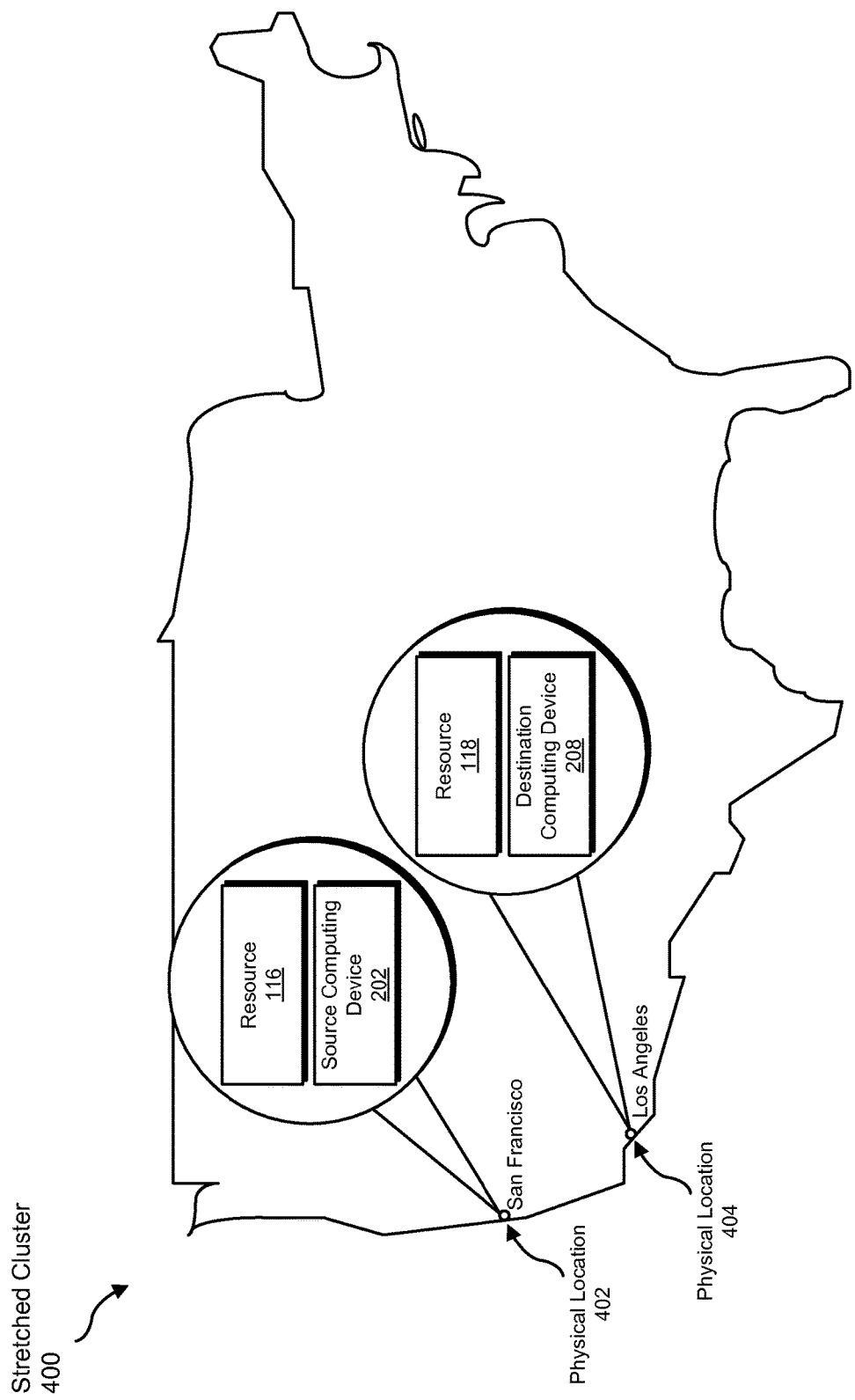
FIG. 4 is an illustration of an exemplary stretched cluster.

In one example, source computing device 202 and destination computing device 208 may form a stretched cluster 400 in FIG. 4 that includes two sites. As illustrated in FIG. 4, stretched cluster 400 may include at least two physical computing systems (in this example, "Source Computing Device 202" and "Destination Computing Device 208") and at least two resources (in this example, "Resource 116" and "Resource 118") respectively located at two sites (in this example, "Physical Location 402" corresponding to "San Francisco" and "Physical Location 404" corresponding to "Los Angeles").

As illustrated in FIG. 3, at step 304 one or more of the systems described herein may locate resource information within the virtual machine that identifies an access path to a resource of the physical computing system despite the migration of the virtual machine from the physical computing system to the different physical computing system. For example, at step 304 identification module 106 may, as part of source computing device 202, destination computing device 208, and/or server 206 in FIG. 2, locate resource information within virtual machine 114 that identifies access path 500 in FIG. 5 to resource 116 of source computing device 202 despite the migration of virtual machine 114 from source computing device 202 to destination computing device 208. In this example, identification module 106 may initiate the process of locating the resource information in response the migration of virtual machine 114 from source computing device 202 to destination computing device 208.

The phrase "resource information," as used herein, generally refers to any type or form of data or information that points to and/or directs a virtual machine to an access path that leads to a resource. Examples of such resource information include, without limitation, Media Access Control (MAC) addresses, Internet Protocol (IP) addresses, Ethernet hardware addresses, network addresses, Uniform Resource Locators (URLs), physical addresses, logical addresses, data addresses, links, combinations of one or more of the same, or any other suitable resource information.

In addition, the phrase "access path," as used herein, generally refers to any type or form of physical path that leads or otherwise facilitates access to a resource within a network or physical computing system.

The systems described herein may perform step 304 in a variety of ways. In some examples, identification module 106 may locate the resource information within at least one network configuration described in virtual machine 114. For example, identification module 106 may identify a network configuration described in virtual machine 114 that points to access path 500 in FIG. 5 at physical location 402 within stretched cluster 400. In this example, identification module 106 may analyze the network configuration described in virtual machine 114 and then determine that the network configuration points to access path 500 in FIG. 5 based at least in part on the analysis.

Figure 5:
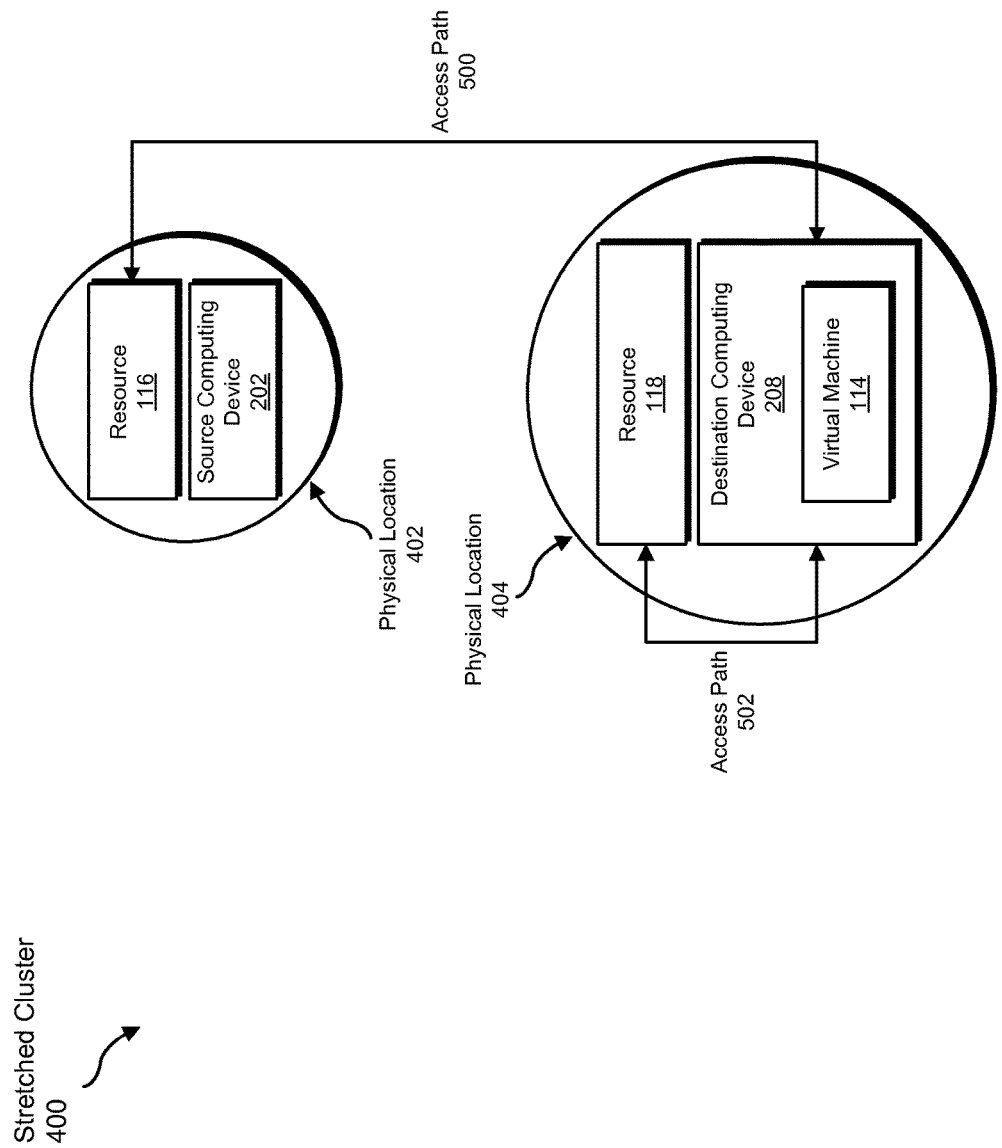
FIG. 5 is an illustration of an exemplary stretched cluster.

As illustrated in FIG. 5, stretched cluster 400 may include at least one physical computing system and at least one resource located at a specific physical location (in this example, "Source Computing Device 202" and "Resource 116" located at "Physical Location 402"), at least one different physical computing system and at least one corresponding resource located at a different physical location (in this example, "Destination Computing Device 208" and "Resource 118" located at "Physical Location 404"), at least one access path leading to the resource at the specific physical location (in this example, "Access Path 500"), and at least one access path leading to the corresponding resource at the different physical location (in this example, "Access Path 502").

In one example, the resource information within virtual machine 114 may still identify access path 500 leading to resource 116 located at physical location 402 despite the migration of virtual machine 114. In other words, the resource information within virtual machine 114 may still point to access path 500 leading to resource 116 located at physical location 402 even though virtual machine 114 has at least started migrating from source computing device 202 located at physical location 402 to destination computing device 208 located at physical location 404. Unfortunately, while access path 500 may have been a relatively efficient path for virtual machine 114 before migrating from source computing device 202, access path 500 may no longer be a relatively efficient path for virtual machine 114 after migrating from source computing device 202.

As illustrated in FIG. 3, at step 306 one or more of the systems described herein may identify a different access path to a corresponding resource of the different physical computing system. For example, at step 306 identification module 106 may, as part of source computing device 202, destination computing device 208, and/or server 206 in FIG. 2, identify access path 502 to resource 118 of destination computing device 208. In this example, identification module 106 may initiate the process of identifying access path 502 to resource 118 in response to the migration of virtual machine 114 from source computing device 202 to destination computing device 208.

The systems described herein may perform step 306 in a variety of ways. In some examples, identification module 106 may obtain a resource update that identifies access path 502 to resource 118 in connection with the event that notifies virtual machine 114 of the migration. The phrase "resource update," as used herein, generally refers to any type or form of information that identifies at least one resource and/or at least one access path that is/are different than the corresponding resource and/or access path identified in the resource information within a virtual machine. Examples of the types or forms information identified in such a resource update include, without limitation, Media Access Control (MAC) addresses, Internet Protocol (IP) addresses, Ethernet hardware addresses, network addresses, Uniform Resource Locators (URLs), physical addresses, logical addresses, data addresses, links, combinations of one or more of the same, or any other suitable information.

In some examples, identification module 106 may receive the resource update via the same communication channel through which the event was provided to virtual machine 114. In one example, the resource update may represent part of the event itself. In another example, the resource update may represent part of at least one communication separate from the event.

In one example, upon obtaining the resource update in connection with the event, identification module 106 may determine that the resource update identifies a different access path than the resource information within virtual machine 114. For example, identification module 106 may determine that the resource update identifies access path 502 that leads to resource 118. In this example, identification module 106 may compare access path 502 identified in the resource update with access path 500 identified in the resource information within virtual machine 114. Identification module 106 may then determine that access path 502 identified in the resource update does not match access path 500 identified in the resource information based at least in part on this comparison.

As illustrated in FIG. 3, at step 308 one or more of the systems described herein may modify the resource information within the virtual machine to identify the different access path to the corresponding resource in order to expedite resource access. For example, at step 308 modification module 108 may, as part of source computing device 202, destination computing device 208, and/or server 206 in FIG. 2, modify the resource information within virtual machine 114 to identify access path 502 to resource 118 of destination computing device 208 in order to expedite resource access. In this example, modification module 108 may initiate the process of modifying the resource information in response to the migration of virtual machine 114 from source computing device 202 to destination computing device 208.

The systems described herein may perform step 308 in a variety of ways. In one example, modification module 108 may modify the resource information within virtual machine 114 in response to the determination that access path 502 identified in the resource update does not match access path 500 identified in the resource information. For example, after identification module 106 has determined that access path 502 identified in the resource update does not match access path 500 identified in the resource information, modification module 108 may change and/or update the resource information within virtual machine 114 to point to access path 502. In this example, the changed and/or updated resource information may cause virtual machine 114 to access resource 118 via access path 502 instead of accessing resource 116 via access path 500 when virtual machine 114 has a need for such a resource.

Accordingly, by modifying the resource information within virtual machine 114, modification module 108 may enable and/or direct virtual machine 114 to access resource 118 via access path 502 instead of accessing resource 116 via access path 500. Moreover, by enabling and/or directing virtual machine 114 to access resource 118 via access path 502 instead of accessing resource 116 via access path 500, modification module 108 may facilitate an increase in the performance and/or efficiency of virtual machine 114.

In other words, since resources 116 and 118 may be at least partially redundant to one another, virtual machine 114 may be able to achieve the same end result by accessing either resource 116 or resource 118. Moreover, since access path 502 may be physically shorter and/or more efficient than access path 500 with respect to destination computing device 208, virtual machine 114 may be able to access resource 118 via access path 502 in a shorter amount of time than virtual machine 114 is able to access resource 116 via access path 500. As a result, by accessing resource 118 via access path 502 instead of accessing resource 116 via access path 500, virtual machine 114 may achieve an increase in performance and/or efficiency.

As explained above in connection with exemplary method 300 in FIG. 3, a stretched cluster may include a physical computing system located in San Francisco and another physical computing system located in Los Angeles. The physical computing system located in San Francisco may include a running virtual machine. In the event that the physical computing system located in San Francisco experiences a failure that potentially prevents the virtual machine from running properly, the virtual machine may migrate from the physical computing system located in San Francisco to the physical computing system located in Los Angeles.

Unfortunately, after migrating to the physical computing system located in Los Angeles, the virtual machine may continue to access one or more resources located in San Francisco even though one or more other suitable resources located in Los Angeles are accessible to the virtual machine. For example, the virtual machine may continue to access a mirrored storage device located in San Francisco even though the other mirrored storage device is located in Los Angeles. In another example, the virtual machine may continue to access a router located in San Francisco even though another suitable router is located in Los Angeles. As a result, the virtual machine may experience a decrease in efficiency and/or performance upon migrating from the physical computing system located in San Francisco to the physical computing system located in Los Angeles.

In an effort to avoid such a decrease in efficiency and/or performance, the physical computing device located in Los Angeles may provide an event to the virtual machine via a communication channel of the virtualization software that facilitates execution of the virtual machine. This event may notify the virtual machine of the migration from the physical computing system located in San Francisco to the physical computing system located in Los Angeles and/or include information that identifies one or more access paths to the other suitable resources located in Los Angeles.

The virtual machine may detect the event provided via the communication channel. In response to detecting this event, the virtual machine may then modify certain resource information used to point the virtual machine to access paths leading to suitable resources based at least in part on the information included in the event. By modifying this resource information, the virtual machine may be able to access the suitable resources located in Los Angeles instead of accessing the resources located in San Francisco. As a result, by accessing the resources located in Los Angeles instead of accessing the resources located in San Francisco, the virtual machine may achieve an increase in performance and/or efficiency.

Figure 6:
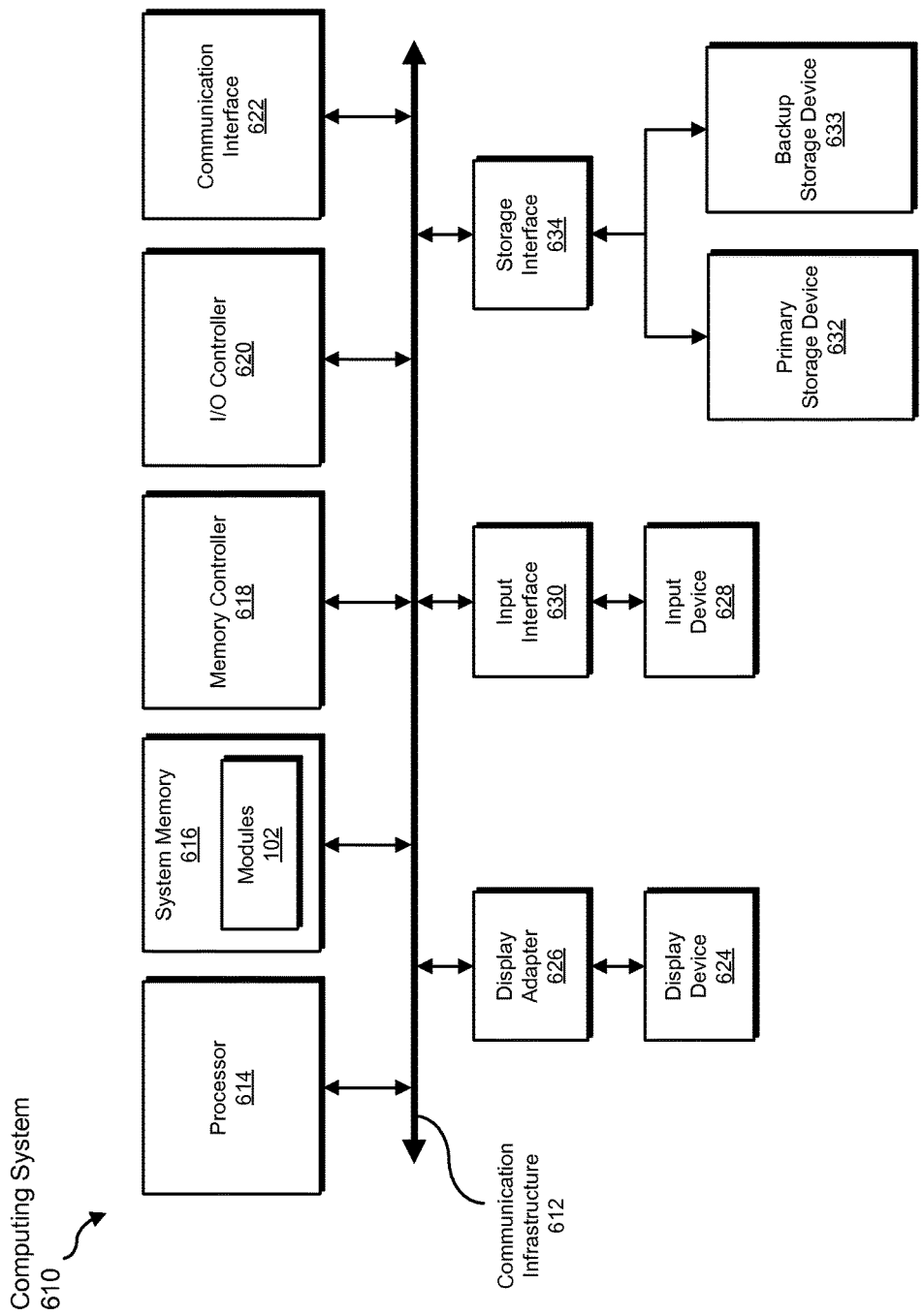
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
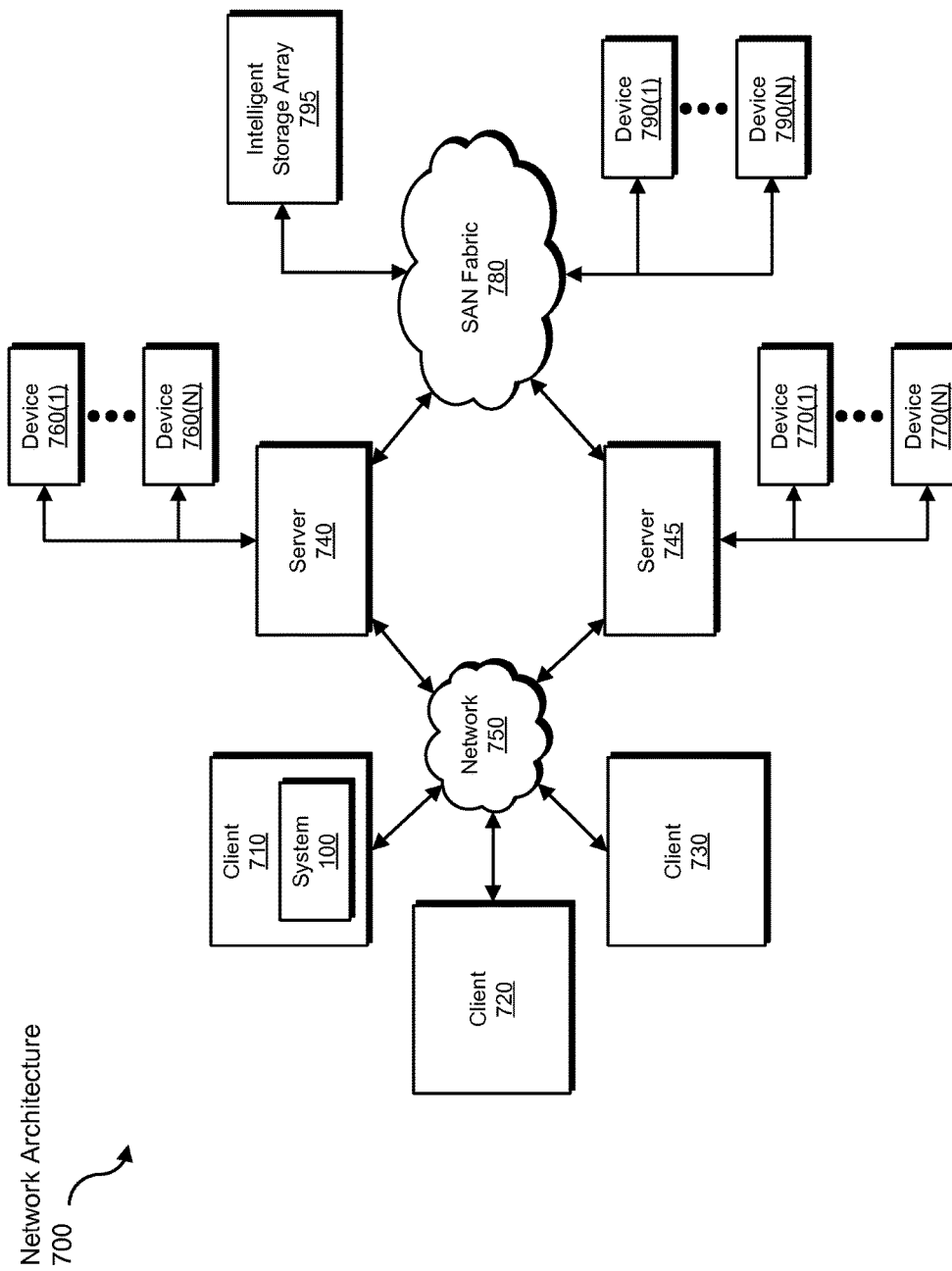
FIG. 7 is a block diagram of an exemplary network architecture capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and intelligent storage array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 in FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for enabling migratory virtual machines to expedite access to resources.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive resource information to be transformed, transform the resource information, output a result of the transformation to facilitate expediting resource access, use the result of the transformation to expedite resource access, and store the result of the transformation for future reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enabling migratory virtual machines to expedite access to resources, at least a portion of the method being performed by a computing device comprising at least one processor, the method comprising:

detecting a migration of a virtual machine from a physical computing system to a different physical computing system, wherein:
the physical computing system comprises a property that is different from a corresponding property of the different physical computing system;
the virtual machine is configured to access a resource of the physical computing system via an access path by way of resource information within the virtual machine; and
the access path comprises a physical path that facilitates access to the resource;

in response to detecting the migration of the virtual machine;
directing a hypervisor that manages the virtual machine to:
provide, as a callback to an operating system kernel of the virtual machine, an event that notifies the virtual machine of the migration of the virtual machine;
insert information about the different physical computing system into the event to notify the virtual machine of the difference between the property of the physical computing system and the corresponding property of the different physical computing system; and
ensure that the virtual machine captures the event at a root privilege level;

locating the resource information within the virtual machine that identifies the access path to the resource of the physical computing system despite the migration of the virtual machine from the physical computing system to the different physical computing system;
identifying, based on the information in the event, a different access path to a corresponding resource of the different physical computing system, wherein:
the corresponding resource of the different physical computing system is partially redundant to the resource of the physical computing system and partially different from the resource of the physical computing system;
the different access path comprises a different physical path that facilitates access to the corresponding resource; and
the different access path to the corresponding resource is physically shorter than the access path to the resource; and
configuring the virtual machine by modifying the resource information within the virtual machine, based on the information in the event, to access the corresponding resource via the different access path instead of the resource via the access path to expedite resource access due at least in part to the different access path being physically shorter than the access path after the migration of the virtual machine, the resource and the corresponding resource being accessible to the virtual machine after the migration to the different physical computing system.

2. The method of claim 1, wherein detecting the migration of the virtual machine from the physical computing system to the different physical computing system comprises:
monitoring the virtual machine for evidence of migration;
while monitoring the virtual machine, detecting evidence indicating that the virtual machine has at least started the migration from the physical computing system to the different physical computing system; and
in response to detecting the evidence, directing the hypervisor to provide the virtual machine with the event that notifies the virtual machine of the migration from the physical computing system to the different physical computing system.

3. The method of claim 2, wherein directing the hypervisor to provide the virtual machine with the event that notifies the virtual machine of the migration comprises:
identifying at least one communication channel of virtualization software that facilitates communication between the virtual machine and at least one hypervisor; and
directing the hypervisor to provide the virtual machine with the event via the communication channel of the virtualization software.

4. The method of claim 3, wherein locating the resource information within the virtual machine that identifies the access path comprises obtaining, via the communication channel of the virtualization software, a resource update that identifies the access path.

5. The method of claim 1, wherein the event comprises information that identifies the different access path to the corresponding resource of the different physical computing system.

6. The method of claim 1, wherein detecting the migration of the virtual machine from the physical computing system to the different physical computing system comprises:
detecting a facilitating event provided by the hypervisor; and
determining that the facilitating event indicates that the virtual machine has at least started the migration from the physical computing system to the different physical computing system.

7. The method of claim 6, wherein identifying the different access path to the corresponding resource of the different physical computing system comprises:
obtaining a resource update that identifies the different access path to the corresponding resource of the different physical computing system in connection with the facilitating event; and
upon obtaining the resource update in connection with the facilitating event, determining that the different access path identified in the resource update does not match the access path identified in the resource information by comparing the different access path with the access path.

8. The method of claim 7, wherein modifying the resource information within the virtual machine to identify the different access path comprises:
in response to determining that the different access path does not match the access path, modifying the resource information within the virtual machine to point to the different access path in order to enable the virtual machine to access the corresponding resource via the different access path in a shorter amount of time than the virtual machine is able to access the resource via the access path.

9. The method of claim 1, wherein:
the physical computing system is located at a specific physical location; and
the different physical computing system is located at a different physical location that is remote from the specific physical location.

10. The method of claim 9, wherein:
the access path to the resource comprises an access path to a storage device located at the specific physical location; and
the different access path to the corresponding resource comprises an access path to a different storage device located at the different physical location.

11. The method of claim 9, wherein:
the access path to the resource comprises an access path to a router located at the specific physical location; and
the different access path to the corresponding resource comprises an access path to a different router located at the different physical location.

12. The method of claim 1, wherein the different access path to the corresponding resource enables the virtual machine to access the corresponding resource in a shorter amount of time than the virtual machine is able to access the resource via the access path.

13. The method of claim 1, wherein the difference between the property of the physical computing system and the corresponding property of the different physical computing system comprises a difference in at least one of:
a processor architecture;
a family of processor;
an installed virtualization software; and
an access path to a specific resource.

14. A system for enabling migratory virtual machines to expedite access to resources, the system comprising:
a detection module, stored in memory, that detects a migration of a virtual machine from a physical computing system to a different physical computing system, wherein:

the physical computing system comprises a property that is different from a corresponding property of the different physical computing system;

the virtual machine is configured to access a resource of the physical computing system via an access path by way of resource information within the virtual machine; and the access path comprises a physical path that facilitates access to the resource;

an event module, stored in memory, that directs a hypervisor that manages the virtual machine to:

provide, as a callback to an operating system kernel of the virtual machine, an event that notifies the virtual machine of the migration of the virtual machine;

insert information about the different physical computing system into the event to notify the virtual machine of the difference between the property of the physical computing system and the corresponding property of the different physical computing system; and ensure that the virtual machine captures the event at a root privilege level;

an identification module, stored in memory, that:

locates the resource information within the virtual machine that identifies the access path to the resource of the physical computing system despite the migration of the virtual machine from the physical computing system to the different physical computing system; and identifies, based on the information in the event, a different access path to a corresponding resource of the different physical computing system, wherein:

the corresponding resource of the different physical computing system is partially redundant to the resource of the physical computing system and partially different from the resource of the physical computing system;

the different access path comprises a different physical path that facilitates access to the corresponding resource; and the different access path to the corresponding resource is physically shorter than the access path to the resource;

a modification module, stored in memory, that configures the virtual machine by modifying the resource information within the virtual machine, based on the information in the event, to access the corresponding resource via the different access path instead of the resource via the access path to expedite resource access due at least in part to the different access path being physically shorter than the access path after the migration of the virtual machine, the resource and the corresponding resource being accessible to the virtual machine after the migration to the different physical computing system; and at least one processor configured to execute the detection module, the event module, the identification module, and the modification module.

15. The system of claim 14, wherein:

the detection module:

monitors the virtual machine for evidence of migration; and detects evidence indicating that the virtual machine has at least started the migration from the physical computing system to the different physical computing system while monitoring the virtual machine; and the event module directs the hypervisor to provide the virtual machine with the event that notifies the virtual machine of the migration in response to the detection of the evidence.

16. The system of claim 15, wherein:

the identification module identifies at least one communication channel of virtualization software that facilitates communication between the virtual machine and at least one hypervisor; and the event module directs the hypervisor to provide the virtual machine with the event via the communication channel.

17. The system of claim 16, wherein the identification module locates the resource information within the virtual machine that identifies the access path by obtaining, via the communication channel of the virtualization software, a resource update that identifies the access path.

18. The system of claim 14, wherein:

the physical computing system is located at a specific physical location;

the different physical computing system is located at a different physical location that is remote from the specific physical location;

the access path to the resource comprises an access path to a router located at the specific physical location; and the different access path to the corresponding resource comprises an access path to a different router located at the different physical location.

19. The system of claim 14, wherein the difference between the property of the physical computing system and the corresponding property of the different physical computing system comprises a difference in at least one of:

a processor architecture;

a family of processor;

an installed virtualization software; and an access path to a specific resource.

20. A non-transitory computer-readable-storage medium comprising one or more computer-executable instructions that, when executed by at least one processor of a computing device, cause the computing device to:

detect a migration of a virtual machine from a physical computing system to a different physical computing system, wherein:

the physical computing system comprises a property that is different from a corresponding property of the different physical computing system;

the virtual machine is configured to access a resource of the physical computing system via an access path by way of resource information within the virtual machine; and the access path comprises a physical path that facilitates access to the resource;

in response to detecting the migration of the virtual machine:

direct a hypervisor that manages the virtual machine to:

provide, as a callback to an operating system kernel of the virtual machine, an event that notifies the virtual machine of the migration of the virtual machine;

insert information about the different physical computing system into the event to notify the virtual machine of the difference between the property of the physical computing system and the corresponding property of the different physical computing system; and ensure that the virtual machine captures the event at a root privilege level;

locate the resource information within the virtual machine that identifies the access path to the resource of the physical computing system despite the migration of the virtual machine from the physical computing system to the different physical computing system;

identify based on the information in the event, a different access path to a corresponding resource of the different physical computing system, wherein:

the corresponding resource of the different physical computing system is partially redundant to the resource of the physical computing system and partially different from the resource of the physical computing system;

the different access path comprises a different physical path that facilitates access to the corresponding resource; and the different access path to the corresponding resource is physically shorter than the access path to the resource; and configure the virtual machine by modifying the resource information within the virtual machine, based on the information in the event to access the corresponding resource via the different access path instead of the resource via the access path to expedite resource access due at least in part to the different access path being physically shorter than the access path after the migration of the virtual machine, the resource and the corresponding resource being accessible to the virtual machine after the migration to the different physical computing system.

* * * * *

UNITED STATES PATENT AND TRADEMARK OFFICE
CERTIFICATE OF CORRECTION

PATENT NO. : 9,575,789 B1
APPLICATION NO. : 13/928340
DATED : February 21, 2017
INVENTOR(S) : Amit Haridas Rangari and Udipta Das Page 1 of 1

It is certified that error appears in the above-identified patent and that said Letters Patent is hereby corrected as shown below:

In the Claims

Claim 1, at Column 20, Lines 49-51, should read:
virtual machine: directing a hypervisor Signed and Sealed this
Thirtieth Day of May, 2017

Michelle K. Lee
*Director of the United States Patent and Trademark Office*